United States Patent Office 2,776,325
Patented Jan. 1, 1957

2,776,325

TERPENE-POLYHALOMETHANE ADDUCT

Robert H. Saunders, West Chester, Pa., assignor to Hercules Powder Company, Wilmington, Del., a corporation of Delaware No Drawing. Original application December 13, 1946, Serial No. 716,187. Divided and this application March 15, 1955, Serial No. 494,575

4 Claims. (Cl. 260—648)

This invention relates to the preparation of new polyhalo derivatives of terpenes and more particularly to the process of forming an adduct of a terpene and a polyhalomethane and the product thereof.

In accordance with this invention it has been found that an adduct of a cyclic terpene and a polyhalomethane may be prepared by reacting a cyclic terpene with a polyhalomethane in the presence of a peroxide catalyst.

The following examples illustrate the preparation of the new terpene adducts in accordance with this invention. All parts and percentages are by weight unless otherwise specified.

Example I

A mixture of 544 parts of beta-pinene, 2460 parts of carbon tetrachloride and 19.3 parts of benzoyl peroxide was refluxed for 18 hours. After cooling, the reaction mixture was washed twice with a 10% solution of sodium bisulfite, 3 times with a 2% solution of sodium hydroxide and finally 5 times with water. The unreacted carbon tetrachloride was distilled from the reaction mixture at a temperature below 80° C. (0.5 mm.) to obtain a yield of crude adduct which corresponded to 75% of the theoretical. The crude adduct which was a viscous solution was seeded and allowed to crystallize. The crystalline beta-pinene-carbon tetrachloride adduct was then filtered off and recrystallized from ethanol to yield a product which melted at 44°–45° C. and which had a chlorine content of 49.0% (theory 48.9%), a molecular weight of 287 (theory 290.1), and a bromine number of 7 (theory 0).

Example II

A mixture of 1228 parts of dipentene and 2770 parts of carbon tetrachloride was refluxed for 3 days, during which time 43.5 parts of benzoyl peroxide were added in small increments. After cooling to room temperature, the reaction mixture was washed twice with an equal volume of 5% sodium hydrosulfite, twice with an equal volume of 2% sodium hydroxide and, finally, twice with water. The unreacted dipentene and carbon tetrachloride were removed by distillation and the residue was then further distilled to yield 20 parts of a fraction boiling below 90° C., 154 parts of a fraction boiling at 90°–170° C. (2.5 mm.), and 53 parts residue.

The first fraction was combined with the distillate of unreacted carbon tetrachloride and dipentene and was treated with 43.5 parts of benzoyl peroxide for 14 hours at reflux temperature. The cooled reaction mixture was successively washed as described above, after which the unreacted dipentene and carbon tetrachloride were distilled from the reaction mixture. On distillation of the second cycle, 474 parts of a middle fraction boiling at 100°–170° C. (at 0.5–7 mm.) were obtained.

As before, the first fraction and the unreacted dipentene and carbon tetrachloride were combined and, for the third cycle, diluted with 2300 parts of carbon tetrachloride. This mixture was refluxed 18 hours with 29 parts of benzoyl peroxide. The reaction mixture was then cooled, washed and distilled as in the foregoing cycles, whereby 432 parts of a fraction boiling at 103°–155° C. (0.5–6 mm.) were obtained.

The total adduct obtained in the three cycles above amounted to 1060 parts which corresponded to a yield of 86.5% based on the weight of dipentene converted. This crude adduct was then distilled to obtain the pure adduct which boiled at 100°–105° C. (0.3 mm.) and which contained 45.1% chlorine (theory 48.9%), and which had a bromine number of 61.5 (theory 55.1) and a molecular weight of 285 (theory 290.1).

Example III

A mixture of 50 parts of beta-terpineol, 154 parts of carbon tetrachloride and 1.6 parts of benzoyl peroxide was refluxed for 6 hours. The unreacted terpineol and carbon tetrachloride were removed from the reaction mixture by steam distillation. The residue was dissolved in petroleum ether and this solution was washed twice with a 2% solution of sodium bicarbonate and then with water. The petroleum ether was removed by evaporation to leave a residue of crude product equal to 38.8 parts. The crude adduct was subjected to vacuum distillation whereby a fraction boiling at 120°–145° C. (0.9 mm.) was obtained which had a chlorine content of 41%, a molecular weight of 294 and a hydroxyl content of 7.9. The overall yield of adduct based on the beta-terpineol converted was 55.2%.

Example IV

A mixture of 1226 parts of camphene and 2750 parts of carbon tetrachloride was refluxed for 130 hours, during which time 65.2 parts of benzoyl peroxide were added in small increments. The reaction mixture was washed with a 10% solution of sodium hydrosulfite, then with a 2% solution of sodium hydroxide, and finally with water. The unreacted camphene and carbon tetrachloride were removed by distillation at 30 mm. pressure. The crude product was distilled under reduced pressure to yield 150 parts of the camphene-carbon tetrachloride adduct.

Example V

Alpha-terpineol was hydrogenated and dehydrated to yield a mixture of dihydrodipentene, dihydroterpinolene, and 3-menthene. A mixture of 138 parts of these mixed menthenes, 611 parts of carbon tetrachloride and 484 parts of benzoyl peroxide was refluxed for 4 hours. The unreacted menthenes and carbon tetrachloride were removed from the reaction mixture by steam distillation. The residue was dissolved in petroleum ether and washed first with a 2% solution of sodium bicarbonate and then with water. The petroleum ether was removed by distillation and the crude adduct was distilled under reduced pressure to yield a fraction boiling at 115°–130° C. at 0.7 mm. pressure.

Example VI

A mixture of 409 parts of alpha-pinene and 920 parts of carbon tetrachloride was refluxed for 64 hours, during which time 20 parts of benzoyl peroxide were added in small increments. The reaction mixture was then washed with a 10% solution of sodium hydrosulfate, a 2% solution of sodium hydroxide and finally with water until it was alkali-free. The unreacted constituents were removed by distillation at 30 mm. pressure. The crude adduct so obtained was subjected to further distillation whereby a partially crystalline fraction was obtained which had a boiling point of 77°–150° C. at 0.5 mm. pressure and contained 40.3% chlorine.

Example VII

A mixture of 34.2 parts of beta-pinene, 237 parts of bromoform, and 2.4 parts of benzoyl peroxide was heated at 90°–95° C. for 18 hours. The unreacted constituents were removed by steam distillation. The crude adduct was distilled under reduced pressure to yield a fraction of beta-pinene-bromoform adduct boiling at 110°–130° C. at 1.0 mm. pressure.

*Example VIII*

A mixture of 950 parts of chloroform, 272 parts of beta-pinene and 4.8 parts of benzoyl peroxide was refluxed for 64 hours. The reaction mixture was then washed with a 10% solution of sodium bisulfite, a 2% solution of sodium hydroxide and finally with water to remove the alkali. The unreacted constituents were removed by distillation, the crude adduct of beta-pinene-chloroform remaining as a residue.

*Example IX*

A mixture of 109 parts of dipentene, 519 parts of chloroform and 8 parts of a 30% solution of acetyl peroxide in dimethyl phthalate was refluxed for 70 hours. The reaction mixture was washed with a 20% solution of sodium hydrosulfite and then with water. On distillation a fraction boiling at 180° C. at 40 mm. pressure was obtained which corresponded to the dipentene-chloroform adduct.

The terpene-polyhalomethane adducts in accordance with this invention may be prepared from any cyclic terpene. Suitable monocyclic terpenes which may be used to prepare these adducts are dipentene, terpinolene, alpha-terpinene, beta-terpinene, gamma-terpinene, alpha-phellandrene, beta-phellandrene, terpineol, limonene, para-menthenes, etc. Bicyclic terpenes which may be used to form the adducts in accordance with this invention are alpha-pinene, beta-pinene, camphene, bornylene, fenchene, etc.

Any polyhalomethane may be used to form the terpene adducts. Suitable polyhalogenated methanes which may be used are cholorform, bromoform, iodoform, carbon tetrachloride, carbon tetrabromide, carbon tetraiodide, methylene chloride, methylene bromide, monobromotrichloromethane, etc.

In carrying out the reaction in accordance with this invention, the terpene and polyhalomethane are contacted with one another in the presence of a peroxide catalyst such as benzoyl peroxide, acetyl peroxide, etc. The amount of catalyst may vary over a wide range but usually an amount of from about 0.002 mole to about 0.1 mole per mole of terpene is sufficient.

Any desired ratio of terpene to polyhalomethane may be used. Frequently a large excess of the polyhalomethane is used to act as a solvent for the reaction. On the other hand the terpene and polyhalomethane may be used in a 1:1 mole ratio since only 1 mole of polyhalomethane is required per mole of terpene to form the adduct. In the case of some polyhalomethanes, it may be desirable to carry out the reaction in the presence of an inert solvent. Solvents which may be used include aliphatic and aromatic hydrocarbons such as hexane, benzene, toluene, etc., or any other solvent which does not enter into the reaction.

The temperature at which the reaction is carried out may vary over a wide range, depending on the polyhalomethane used. The reaction is conveniently carried out at the reflux temperature of the polyhalomethane used in the reaction. Usually, a temperature of from about 70° C. to about 160° C. is preferred but higher temperatures may be used in the case of the less active polyhalomethanes. If desired the reaction may be carried out under pressure, but usually this is not necessary.

As may be seen from the foregoing examples the reaction in accordance with this invention may be carried out as a simple batch process or as a cyclic or continuous process, higher yields being obtained in the latter case.

The new terpene-polyhalomethane adducts, prepared in accordance with this invention, may be used as oil additives, plasticizers, etc., and as intermediates in the synthesis of acids, amides and amines.

This application is a division of my copending application Serial No. 716,187, filed December 13, 1946, now abandoned.

What I claim and desire to protect by Letters Patent is:

1. The process of preparing a terpene-polyhalomethane adduct which comprises heating a monocyclic terpene with a polyhalomethane in the presence of an organic peroxide catalyst.

2. The process of preparing a dipentene-carbon tetrachloride adduct which comprises heating dipentene with carbon tetrachloride in the presence of an organic peroxide catalyst.

3. A monocyclic terpene-polyhalomethane adduct prepared by heating a monocyclic terpene with a polyhalomethane in the presence of an organic peroxide catalyst.

4. A dipentene-carbon tetrachloride adduct prepared by heating dipentene with carbon tetrachloride in the presence of an organic peroxide catalyst.

References Cited in the file of this patent

UNITED STATES PATENTS

| | | |
|---|---|---|
| 2,354,775 | Rummelsburg | Aug. 1, 1944 |
| 2,383,084 | Rummelsburg | Aug. 21, 1945 |
| 2,384,400 | Rummelsburg | Sept. 4, 1945 |
| 2,410,541 | Joyce | Nov. 6, 1946 |

OTHER REFERENCES

Simonsen: "The Terpenes," vol. 2, page 264 (1932).
Kharasch: "Science," vol. 102, page 128 (1945).